United States Patent [19]

Samoel

[11] 3,792,238

[45] Feb. 12, 1974

[54] PROCESS FOR REGISTERING IN BINARY CODE AND FOR READING AN IDENTIFICATION NUMBER ON A METALLIC PIECE

[75] Inventor: Alain Jean Samoel, Manosque, France

[73] Assignee: Commissariat A L'Energie Atomique, Paris, France

[22] Filed: Aug. 7, 1972

[21] Appl. No.: 278,386

[30] Foreign Application Priority Data

Aug. 6, 1971 France ............................. 7128851

[52] U.S. Cl. ................ 235/61.11 J, 51/319, 346/75

[51] Int. Cl. ............................................ G06k 1/12

[58] Field of Search .. 235/61.11 J, 61.11 E; 51/310, 51/319; 346/75

[56] References Cited

UNITED STATES PATENTS

| | | | |
|---|---|---|---|
| 1,841,452 | 1/1932 | Ranger | 346/75 |
| 3,584,571 | 6/1971 | Schmoll | 346/75 X |
| 3,044,218 | 7/1962 | Munn | 51/310 X |
| 3,520,086 | 7/1970 | Stevens | 51/310 X |

*Primary Examiner*—Paul J. Henon
*Assistant Examiner*—Joseph M. Thesz, Jr.

[57] ABSTRACT

The invention is concerned with a method and apparatus for recording an identification number in binary code and reading it on a metal component such as a fuel element canning tube. A number of microsandblasting jets, each corresponding to one of the binary code numbers of the number to be recorded, are directed to different portions of the component and each jet is deflected before its arrival depending upon whether it corresponds to the number 1 or the number 0. The component is subjected to a reading operation using beams of light.

4 Claims, 4 Drawing Figures

Figure 1:
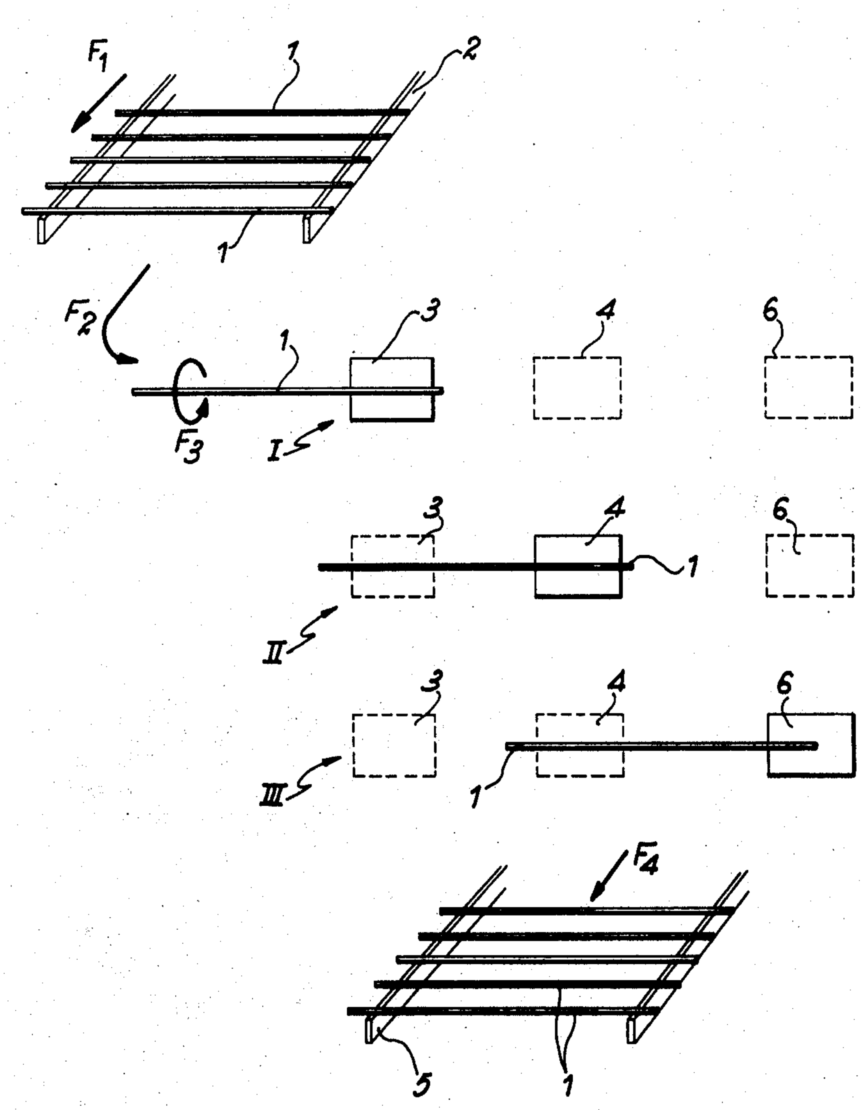

PROCESS FOR REGISTERING IN BINARY CODE AND FOR READING AN IDENTIFICATION NUMBER ON A METALLIC PIECE

This invention relates to a method of recording an identification number in binary code and reading the same on a metal component, and to apparatus for performing the method.

It is practically impossible for a very small numbers to be read in plain language, i.e., by direct reading.

It is frequently necessary to number small identical metal components and, particularly fuel element canning tubes, so as to permit their identification.

Methods are already known for such identification, using the binary system.

For example, a series of parallel lines may be engraved on the metal component in a binary code and these lines may be read by means of a mechanical sensor. More accurately, each number 1 in the identification number in the binary code to be recorded on the component is represented by an engraved line, while there is no inscription in the case of each number 0, and the positions of any successive lines on the component are equidistant. Reading by means of the sensor is on the yes/no principle.

Any inscription made by such a known method is indelible but it has the disadvantage of slightly changing the characteristics of the workpiece treated, because of the removal of metal.

In another known method, a line of magnetic varnish is deposited on the metal component at the location of each number 1 in the binary code identification number, and reading is carried out by means of a coil which induces eddy currents into the component.

The advantage of such a method is that the characteristics of the component are unaffected since there is no removal of metal, but this method has the disadvantage that the inscription may change or even become erased during cleaning of the component.

The binary code recording method according to the invention has the double advantage of providing an indelible inscription without any removal of the metal.

According to the invention there is provided a method of recording an identification number in binary code and reading the same on a metal component, said method being characterised in that it comprises directing microsandblasting jets towards different portions of the component, each of these jets corresonding to one of the binary code numbers of the number which is to be recorded, deflecting each jet before its arrival at the workpiece depending upon whether it corresponds to the number 1 or to the number 0, and subjecting the component which has undergone this microsandblasting operation to a reading operation.

Advantageously, the said microsandblawting jets are parallel and equidistant.

By way of example, the said reading operation comprises the projecting on to the said component beams of light the spacing between which is identical to that of the microsandblasting jets, at an incidence different from the normal and in such a manner that each portion of said component which has undergone microsandblasting receives one of these beams of light, and subjecting each beam reflected by the component to a logic reading system having a variable trigger threshold, each logic system being triggered or remaining inoperative depending upon whether the light intensity that it receives from the reflected beam has a value on one or other side of a given value, the value of this light intensity being a function of the diffraction experienced on its impact on the workpiece by the incident beam of light to which the said reflected beam corresponds, and said diffraction itself being a function of whether the portion of the tube covered by this incident beam has or has not been subjected to the microsandblasting operation and hence corresponds to one of the numbers 1 and 0 in the binary code number to be read.

The invention also relates to apparatus for performing the above described method, said apparatus being characterised in that it comprises a storage tank for the components for treatment, a component transfer device, a sand-blasting box having a runway adapted to receive the components from tbe transfer device, said box having a series of slots formed in a wall parallel to said runway, a sand-blasting nozzle applied against the said box and adapted to project abrasive sand normally on to the said wall and traverse its various slots, in register with each of said slots, a compressed air inlet pipe adapted to deflect as required the jet of sand which has traversed said slot and a reading device.

The slots in the sand-blasting box are, for example, parallel and equidistant.

According to one embodiment, the said reading device comprises a runway adapted to receive the components as they leave the sand-blasting box, and an optical system intended firstly to deliver a number of light beams equal to the number of said slots, of equal intensity perpendicularly to the said runway, their distribution being identical to that of the slots in the sand-blasting box and, secondly, collect each reflected beam corresponding to an incident beam after its reflection from the component, and for each of said reflected beams a reader consisting of a photoelectric cell disposed in the patb of the reflected beam and a logic system having a variable trigger threshold adapted to be triggered by said cell. The apparatus may also comprise a transfer device adapted to receive the components from the reading device, a component reception tank fed by said transfer device, and a control device comprising a keyboard on which the operative taps out the identification number of the component and which triggers the successive operations of sand-blasting, reading and introduction of the components into the reception tank.

Figure 2:
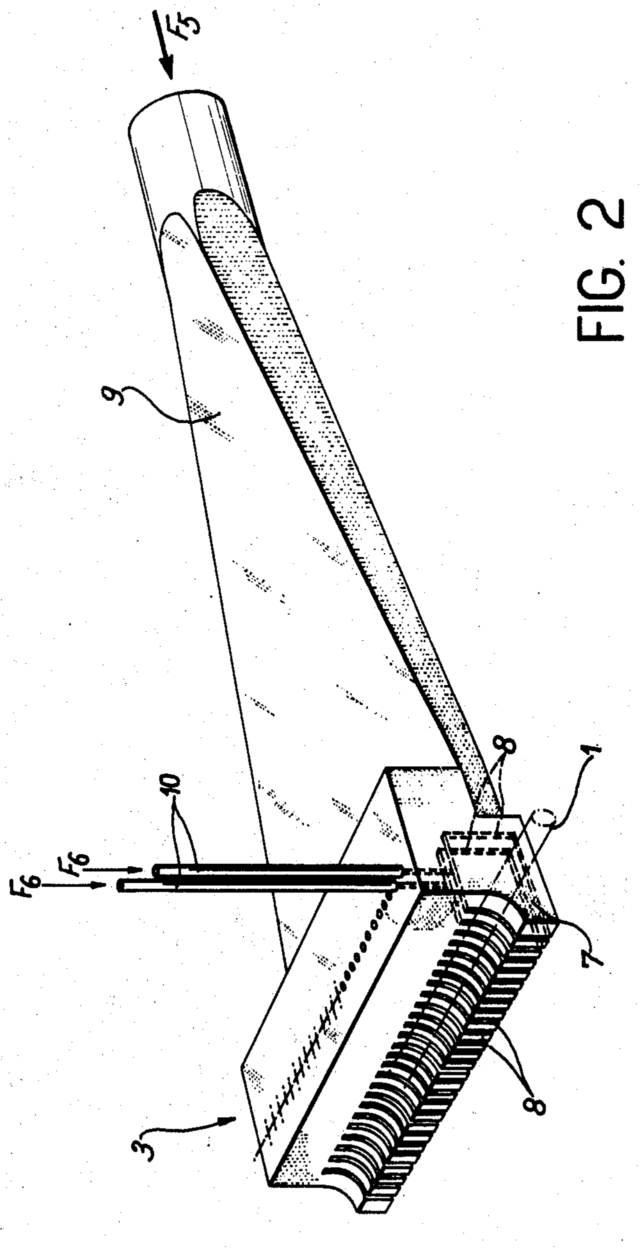
Figure 3:
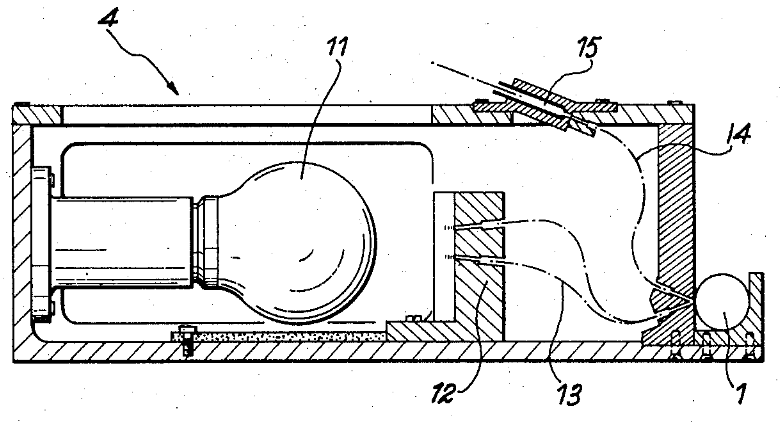
Figure 4:
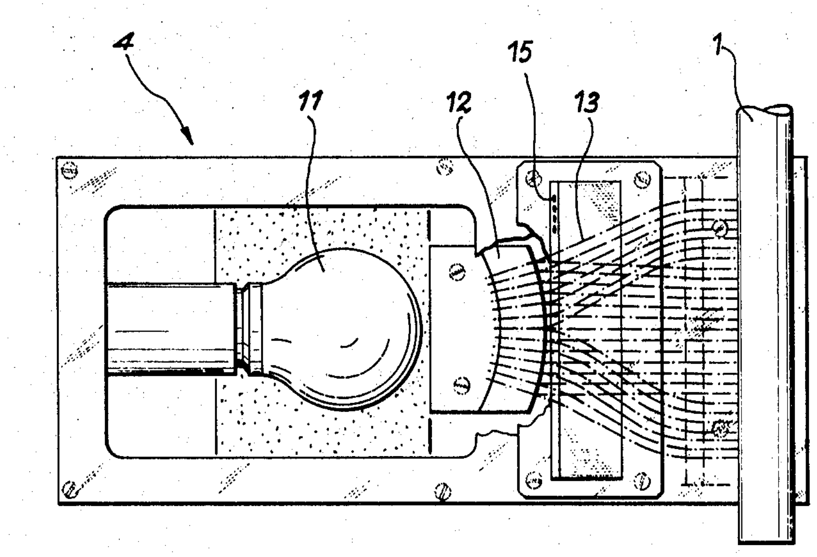

The invention will now be described by way of example with reference to the accompanying drawings in which :

FIG. 1 is a diagram showing the principle of operation of the apparatus according to the invention (in this Figure, the references I, II and III denote the same group of elements of the apparatus at three successive stages of operation), FIG. 2 is a perspective view of the sand-blasting box and its nozzle, and FIG. 3 and FIG. 4 are respectively elevation and plan views of the optical system.

The general principle of operation of the apparatus according to the invention is as follows (FIG. 1).

After the operative has tapped out the identification number of the component in the binary system (i.e., using 0 and 1 only) on the keyboard of a control device (not shown), each component 1 for treatment (for example a fuel element canning tube) leaves the storage tank 2 (arrow $F_1$), is passed (arrow $F_2$) by a transfer device (not shown) to a sand-blasting box 3, in which it turns on itself (arrow $F_3$), and then after sand-blasting partially enters an optical device 4 which projects on to the said component a series of equidistant beams of light which are reflected from the component and each of which acts on a reading device (not shown); after reading, the component 1 is driven (arrow $F_4$) by a transfer device (not shown) into a reception tank 5 in which the components 1 accumulate successively after reading.

If necessary, the component 1 undergoes two successive sand-blasting operations in two portions of its length, in which case, between the above reading operation and transfer to tbe reception tank 5 the component 1 undergoes a return to the sand-blasting box 3 and then a return to the optical device 4. These two sand-blasting operations are carried out in the case of fuel element canning tubes, one of the operations being carried out on the fissile part and the other on the fertile part.

Finally, in addition to this sand-blasting and reading operation, which are complementary, the component 1 may undergo at one of its ends a plain-language marking by means of an electromagnetic hammer disposed at 6.

The sand-blasting box and its nozzle, and the optical device, will be described hereinafter in greater detail with reference respectively to FIGS. 2, 3 and 4, assuming that the component 1 is a fuel element canning tube.

The sand-blasting box and its nozzle (FIG. 2):

This box 3 comprises a runway 7 and a series of parallel and equidistant slots 8, and the nozzle 9 projects abrasive sand (arrow $F_5$) in the direction of said slots. Above the sand-blasting box 3 and in register with each of the slots 8 there is disposed a compressed air inlet pipe 10 (arrows $F_6$).

This sand-blasting box operates as follows. After the operative has operated the control device keyboard, the component 1 for treatment arrives in the sand-blasting box 3 as explained hereinbefore, and then stops. It starts to turn on itself (arrow $F_3$) and at the same time receives a blast of sand via each of the slots 8 from the nozzle 9.

The code selected is such that:

a. If a slot 8 corresponds to a 0 of the identification number expressed in the binary system, the sand jet which corresponds to it must carry out sand-blasting on the component 1, such sand-blasting operation being required to provide a sand-blasted ring on the component as a result of rotation of the component on itself. The sand-blasting jet may, if required, be formed from very small diameter glass balls (diameter of a few microns).

b. If a slot 8 corresponds to a 1 in the identification number, the sand jet corresponding thereto must not sand-blast the component 1, and for this purpose provision is made for a compressed air jet (triggered by a pneumatic logic system in the accordance with the data given by the control desk) to arrive by the pipeline 10 (arrow $F_6$) and automatically deflect the jet of sand, thus preventing a sand-blasted ring from being formed at the slot 8 in question.

The successive rows of the code elements in the form of rings are to a 3 mm pitch, the thickness of a ring being 1 mm.

In addition to the sand-blasting rings corresponding to the identification number of the componnet 1, two additional rings are sand-blasted at the numbering end; these two rings enable rapid reading to be carried out by means of the optical device 4 by checking the centring of the component 1.

Optical device (FIGS. 3 and 4) and reading device:

When sand-blasting has ended, the component 1 reaches the runway of the optical device 4 and then stops.

The optical system of the device 4 comprises a light source 11 and a condenser 12, a first set of optical fibres 13 of a number equal to the number of slots 8 in the sand-blasting box and a second set of optical fibres 14.

At the end of each fibre of the set 14 is a photoelectric cell 15 associated with an operational amplifier (not shown), the triggering threshold of which is variable.

Operation of the optical device and of the reading device is as follows:

The component 1 provided with the sand-blasted rings is illuminated by the optical fibres 13. More accurately, since the spacing between the optical fibres is equal to the spacing of the slots 8 in the sand-blasting box, the component 1 receives a beam of light on each of those parts which was previously in register with a slot 8, irrespective of whether that part was sand-blasted or not.

The incidence of the beams of light from the optical fibres 13 on the component 1 is at an angle other than zero, for example 20°, and a beam reflected by the component 1 corresponds to each incident beam.

The principle of the optical device 4 is as follows:

Each non-sandblasted ring of the component 1 which, as explained hereinbefore, corresponds to a 1 in the identification number, reflects the beam of light it receives from the optical fibre 13 in front of which it is situated, and this reflection is without any appreciable diffraction, so that the corresponding photoelectric cell 15 receives via the optical fibre 14 an amount of light sufficient to trigger the logic level, which then displays a 1.

On the other hand, each sand-blasted ring produces a diffraction such that the light received by the corresponding cell 15 is insufficient to trigger the logic level, which therefore displays a 0.

The method according to the invention is indelible and non-destructive since there is strictly speaking no metal removal from the components for treatment, but simply a very superficial cold working. The roughness of the sand-blasted parts is very slight (of the order of a micron) and cannot be detected metrologically or by the most refined non-destructive inspection means.

The apparatus according to the invention may operate with manual or automatic control:

a. Manual control:

When the operative has displayed the identification number, he gives the sand-blasting order by pressing a sand-blasting press button. On completion of sand-blasting, the displayed number disappears and the operative can then display any new number.

b. Automatic control:

The operative switches the apparatus to automatic operation and at the end of the sand-blasting operation there is automatically an increase by one unit of the number to be marked on the next component 1.

I claim:

1. A method of recording an identification number in binary code and reading the same on a metal component, said method being characterised in that it comprises directing microsandblasting jets towards different portions of the component, each of these jets corresponding to one of the binary code numbers of the number which is to be recorded, deflecting each jet beofre its arrival at the workpiece depending upon whether it corresponds to the number 1 or to the number 0, subjecting the component which has undergone this microsandblasting operation to a reading operation, said microsandblasting jets being parallel and equidistant, said reading operation including projecting on to said component beams of light the spacing between which is identical to that of the microsandblasting jets, at an incidence different from the normal and in such a manner that each portion of said component which has undergone microsandblasting receives one of these beams of light, and subjecting each beam reflected by the component to a logic reading system having a variable trigger threshold, each logic system being triggered or remaining inoperative depending upon whether the light intensity that it receives from the reflected beam has a value on one or other side of a given value, the value of this light intensity being a function of the diffraction experienced on its impact on the workpiece by the incident beam of light to which the said reflected beam corresponds, and said diffraction being a function of whether the portion of the tube covered by this incident beam has or has not been subjected to the microsandblasting operation and hence corresponds to one of the numbers 1 and 0 in the binary code number to be read.

2. Apparatus for recording an identification number in binary code and reading it on a metal component comprising a storage tank for tbe components for treatment, a component transfer device, a sandblasting box having a runway adapted to receive the components from the transfer device, said box having a series of slots formed in a wall parallel to said runway, a sandblasting nozzle applied against the said box and adapted to project abrasive sand normally on to the said wall and traverse its various slots, in register with each of said slots, a compressed air inlet pipe to deflect as required the jet of sand which has traversed said slot and a reading device, a runway adapted to receive the components as they leave the sandblasting box, and an optical system firstly to deliver a number of light beams equal to the number ofsaid slots, of equal intensity perpendicularly to said runway, their distribution being identical to that of the slots in the sand-blasting box and, secondly, collect each reflected beam corresponding to an incident beam after its reflection from the component, and for each of said reflected beams a reader consisting of a photoelectric cell disposed in the path of the reflected beam and a logic system having a variable trigger threshold adapted to be triggered by said cell.

3. Apparatus according to claim 2 including a transfer device to receive the components from the reading device, a component reception tank fed by said transfer device, and a control device including a keyboard on which the operator taps out the identification number of the component which triggers the successive operations of sand-blasting, reading and introduction of the components into the reception tank.

4. Apparatus according to claim 2, the slots in the sand-blasting box being parallel and equidistant.

* * * * *